(12) United States Patent
Ando et al.

(10) Patent No.: US 6,553,184 B1
(45) Date of Patent: Apr. 22, 2003

(54) METHOD OF CONVERTING TWO DIMENSIONAL IMAGES INTO THREE-DIMENSIONAL IMAGES

(75) Inventors: Takahisa Ando, Kadoma; Teruhiro Yamada, Hirakata; Nobuaki Uwa, Akashi; Tetsuya Enomoto, Hirakata, all of (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/008,806

(22) Filed: Jan. 20, 1998

Related U.S. Application Data (63) Continuation of application No. 08/402,946, filed on Mar. 13, 1995, now abandoned.

(30) Foreign Application Priority Data

Mar. 14, 1994 (JP) .............................................. 6-042462
Jul. 14, 1994 (JP) .............................................. 6-162259

(51) Int. Cl.[7] .......................... H04N 5/77; H04N 5/775
(52) U.S. Cl. ......................................... 386/117; 368/62
(58) Field of Search .......................... 386/46, 107, 117, 386/120, 4, 1, 28, 38; 348/42, 43, 44, 46, 51, 47, 48, 49, 50; H04N 5/77, 5/775

(56) References Cited

U.S. PATENT DOCUMENTS 5,510,832 A  *  4/1996  Garcia .......................... 348/56

* cited by examiner

Primary Examiner—Robert Chevalier
(74) Attorney, Agent, or Firm—Arent Fox Kintner Plotkin & Kahn (57) ABSTRACT

The present invention relates to a method of converting two-dimensional images into three-dimensional images. In the present invention, a first image which forms the basis and a second image obtained by horizontally shifting the first image are produced from the original two-dimensional image. One of the first image and the second image is taken as a left eye image, and the other image is taken as a right eye image. If the left eye image and the right eye image obtained are displayed on a display almost simultaneously, and the left eye image and the right eye image displayed are viewed with the left eye and the right eye of a viewer, therefore, the original two-dimensional image is recognized as an image having a three-dimensional effect by the viewer even when it is a still image.

13 Claims, 8 Drawing Sheets

METHOD OF CONVERTING TWO DIMENSIONAL IMAGES INTO THREE-DIMENSIONAL IMAGES

This application is a continuation of 08/402,946 filed Mar. 31, 1995 now abandoned.

BACKGROUND OF THE INVENTION

1. Field of the Invention

The present invention relates to a method of converting two-dimensional (2 D) images which are outputted from VTRs, video cameras and the like and transmitted by CATV (Cable Television) broadcasting and TV broadcasting and the like into three-dimensional (3 D) images.

2. Description of the Prior Art

Most of 3 D image software used in a 3 D display system which has been recently topical is produced particularly for the 3 D display system. Such 3 D image software is generally recorded by picking up a left eye image and a right eye image using two cameras. The left eye image and the right eye image which are recorded on 3 D image software are displayed with they overlapped with each other on one display almost simultaneously. The left eye image and the right eye image which are displayed with they overlapped with each other are separately incident on the left eye and the right eye of a viewer, whereby the viewer recognizes a 3 D image.

A lot of types of 2 D image software currently exist. If a 3 D image can be produced from the 2 D image software, therefore, time and labor required to produce 3 D image software having the same content as that of the existing 2 D image software again from the beginning are conserved.

Consequently, a method of converting 2 D images into 3 D images has been already proposed. Specifically, in the case of a 2 D image in which an object moves from the right to the left against a background is projected, the 2 D image is taken as a right eye image, and an image several fields ahead of the right eye image is taken as a left eye image. Consequently, binocular parallax thus occurs between the left eye image and the right eye image. If both the images are displayed on a screen almost simultaneously, and the left eye image and the right eye image are respectively viewed with the left eye and the right eye of the viewer, therefore, the moving object is recognized as if it jumped out forward from the background.

In the above described method, however, a 3 D image having binocular parallax can be obtained if the original 2 D image is a moving image horizontally moving, while a 3 D image having binocular parallax cannot be obtained if the original 2 D image is a still image.

In some cases, the movement of an object desired to be recognized as if it jumped out of a screen surface is small and the movement of a background is large depending on the content of 2 D image software (a story). For example, consider a case where the background moves from the right to the left. In this case, if the original 2 D image is taken as a left eye image and an image several fields ahead of the left eye image is taken as a right eye image, the background is recognized as if it existed behind the screen surface. As a result, the object whose movement is small is recognized as if it jumped out forward from the background. In this case, however, an image of the object is on the screen surface. Accordingly, the distance from the screen surface to the image of the object recognized by the viewer is zero, whereby an impressive 3 D effect cannot be obtained.

SUMMARY OF THE INVENTION

An object of the present invention is to provide a method of converting 2 D images into 3 D images, in which a 3 D image having binocular parallax can be obtained even if the original 2 D image is a still image.

Another object of the present invention is to provide a method of converting 2 D images into 3 D images, in which a 3 D image having an impressive 3 D effect is obtained.

Still another object of the present invention is to provide a method of converting 2 D images into 3 D images, in which an impressive 3 D image is obtained from a 2 D image in which an object does not move and a background moves.

(1) Description of a first method of converting 2 D images into 3 D images according to the present invention The first method of converting 2 D images into 3 D images is characterized by comprising the step of producing from a 2 D image a first image which forms the basis and a second image obtained by horizontally shifting the first image and taking one of the first image and the second image as a left eye image and taking the other image as a right eye image.

The above described second image is produced by storing the first image in a memory for each horizontal scanning period and adjusting the position where the readout of the image stored in the memory is started to read out the image stored in the memory, for example.

In the first method of converting 2 D images into 3 D images according to the present invention, a 3 D image signal (a left eye image and a right eye image) having binocular parallax is obtained from a 2 D image which is a still image.

(2) Description of a second method of converting 2 D images into 3 D images according to the present invention The second method of converting 2 D images into 3 D images is characterized by comprising the steps of judging whether a 2 D image is a moving image or a still image, producing from the 2 D image a first image which forms the basis and a second image which is delayed along the time base from the first image and taking one of the first image and the second image as a left eye image and taking the other image as a right eye image when it is judged that the 2 D image is a moving image, and producing from the 2 D image a third image which forms the basis and a fourth image obtained by horizontally shifting the third image and taking one of the third image and the fourth image as a left eye image and taking the other image as a right eye image when it is judged that the 2 D image is a still image.

The judgment whether the 2 D image is a moving image or a still image is made by detecting a vector on the movement of the 2 D image and on the basis of the magnitude of the detected vector. In this case, it is judged that the 2 D image is a still image when a horizontal component of the vector is not more than a predetermined value, and it is judged that the 2 D image is a moving image when the horizontal component of the vector is more than a predetermined value.

The above described second image is produced by storing the first image in the memory and reading out from the memory an image which is delayed by a predetermined number of fields from the first image, for example.

The above described fourth image is produced by storing the third image in the memory for each horizontal scanning period and adjusting the position where the readout of the image stored in the memory is started to read out the image stored in the memory, for example.

In the second method of converting 2 D images into 3 D images according to the present invention, even when the 2 D image signal is a moving image or a still image, a 3 D image signal having binocular parallax is obtained.

(3) Description of a third method of converting 2 D images into 3 D images according to the present invention The third method of converting 2 D images into 3 D images is characterized by comprising the steps of producing from a 2 D image a first image which forms the basis and a second image which is delayed along the time base from the first image, and producing from the second image a third image obtained by horizontally shifting the second image and taking one of the first image and the third image as a left eye image and taking the other image as a right eye image.

The above described second image is produced by storing the first image in the memory and reading out from the memory an image which is delayed by a predetermined number of fields from the first image, for example.

The above described third image is produced by storing the second image in the memory for each horizontal scanning period and adjusting the position where the readout of the image stored in the memory is started to read out the image stored in the memory, for example.

In the third method of converting 2 D images into 3 D images according to the present invention, it is possible to realize from a 2 D image in which an object does not move and a background moves an impressive 3 D image in which the object and the background are recognized as if the background existed ahead of a screen surface of a display and the object existed ahead of the background.

(4) Description of a fourth method of converting 2 D images into 3 D images according to the present invention The fourth method of converting 2 D images into 3 D images is characterized by comprising the steps of producing from a 2 D image a first image which forms the basis and a second image which is delayed along the time base from the first image, and producing from the first image a third image obtained by horizontally shifting the first image and taking one of the second image and the third image as a left eye image and taking the other image as a right eye image.

The above described second image is produced by storing the first image in the memory and reading out from the memory an image which is delayed by a predetermined number of fields from the first image, for example.

The above described third image is produced by storing the first image in the memory for each horizontal scanning period and adjusting the position where the readout of the image stored in the memory is started to read out the image stored in the memory.

In the fourth method of converting 2 D images into 3 D images according to the present invention, it is possible to realize from a 2 D image in which an object does not move and a background moves an impressive 3 D image in which the object and the background are recognized as if the background existed ahead of a screen surface of a display and the object ahead of the background.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made of embodiments of the present invention with reference to the drawings.

(1) Description of a first embodiment of the present invention

Figure 1A:
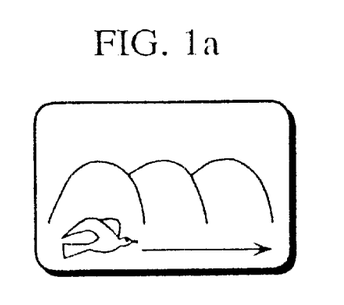
FIGS. 1a, 1b and 1c are schematic views for explaining the principle of converting a 2 D image into a 3 D image in a case where the 2 D image is a moving image.
Figure 1B:
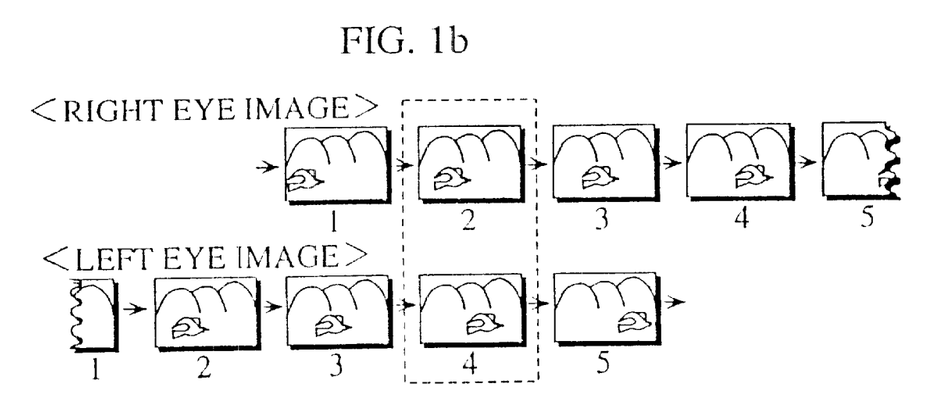
Figure 1C:
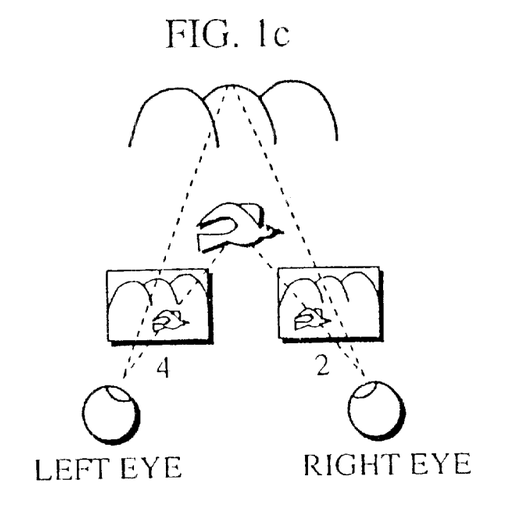

Description is now made of the basic principle of converting a 2 D image into 3 D image in a case where the 2 D image is a moving image on the basis of FIGS. 1a, 1b and 1c.

An image scene in which a background (a mountain in this example) does not change and an object (a bird in this example) moves from the left to the right, as shown in FIG. 1a. As shown in FIG. 1b, if a right eye image and a left eye image between which a predetermined time difference is provided are produced, the position of the object differs by the amount of the movement of the object between the right eye image and the left eye image. As shown in FIG. 1c, therefore, the difference in the position of the object between the right eye image and the left eye image becomes binocular parallax, thereby to make it possible to view a 3 D image. Numerals in FIGS. 1b and 1c indicate field numbers.

In reproducing a left eye image and a right eye image from 2 D image software, if one of the images is thus delayed by one to several fields from the other image, the original software can be converted into a 3 D image, which comprises a right eye image and a left eye image, having binocular parallax.

Under the foregoing principle, a 3 D image signal having binocular parallax can be produced from a 2 D image which horizontally moves, while a 3 D image signal having binocular parallax cannot be produced from a 2 D image which hardly horizontally moves.

Figure 2A:
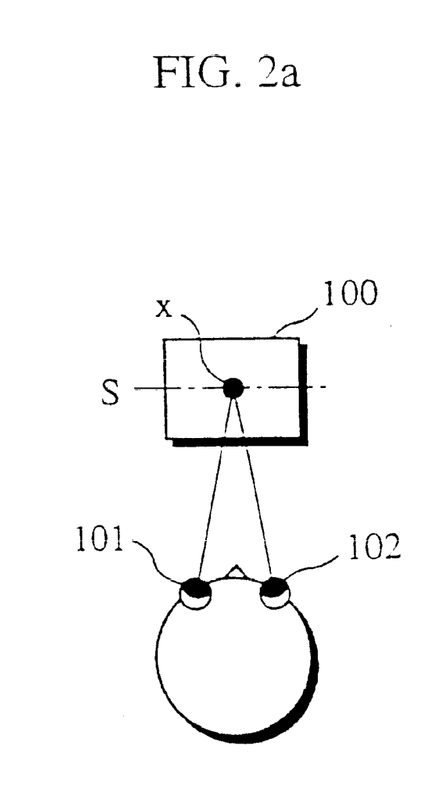
FIGS. 2a, 2b and 2c are schematic views for explaining the principle of converting a 2 D image into a 3 D image in a case where the 2 D image is a still image.
Figure 2B:
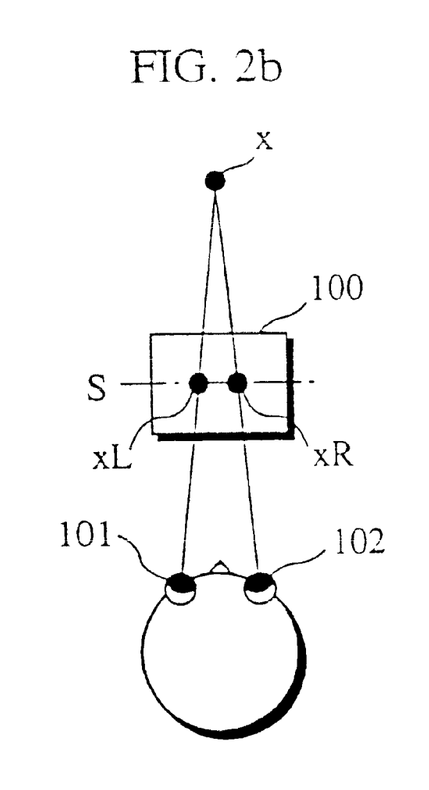
Figure 2C:
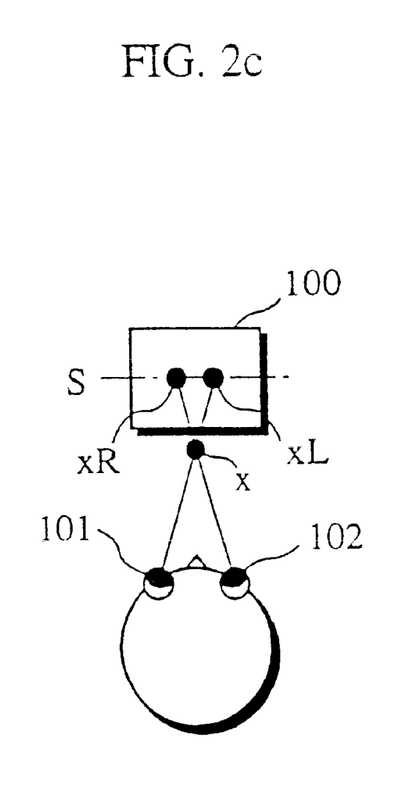

Description is now made of the basic principle of a method of converting a 2 D image which does not horizontally move, for example, a still image into a 3 D image on the basis of FIGS. 2a, 2b and 2c.

It is assumed that a still image is directly displayed on a display. In this case, even if an object x displayed on a screen surface S of a display 100 is viewed with the left eye 101 and the right eye 102 of a viewer, there occurs no binocular parallax, thereby to make it impossible to recognize the object x with a 3 D effect.

Therefore, as shown in FIG. 2b, the whole of the still image is shifted to the left by a predetermined amount to produce a left eye image, and the whole of the still image is shifted to the right by a predetermined amount to produce a right eye image. If an object xL within the left eye image is viewed with only the left eye 101 and an object xR within the right eye image is viewed with only the right eye 102, there occurs binocular parallax, whereby the object x is recognized as if it existed in the position where lines of sight of the eyes intersect each other. In this case, the object x is recognized as if it existed behind the screen surface S, thereby to obtain an image having a 3 D effect.

Furthermore, as shown in FIG. 2c, the whole of the still image is shifted to the right by a predetermined amount to produce a left eye image, and the whole of the still image is shifted to the left by a predetermined amount to produce a right eye image. If the object xL within the left eye image is viewed with only the left eye 101 and the object xR within the right eye image is viewed with only the right eye 102, there occurs binocular parallax, whereby the object x is recognized as if it existed in the position where lines of sight x of the eyes intersect each other. In this case, the object x is recognized as if it existed ahead of the screen surface S, thereby to obtain an image having a 3 D effect.

The whole of the original still image may be horizontally shifted to produce one shifted image, thereby to take either one of the original still image and the shifted image as a left eye image and take the other image as a right eye image.

Figure 3:
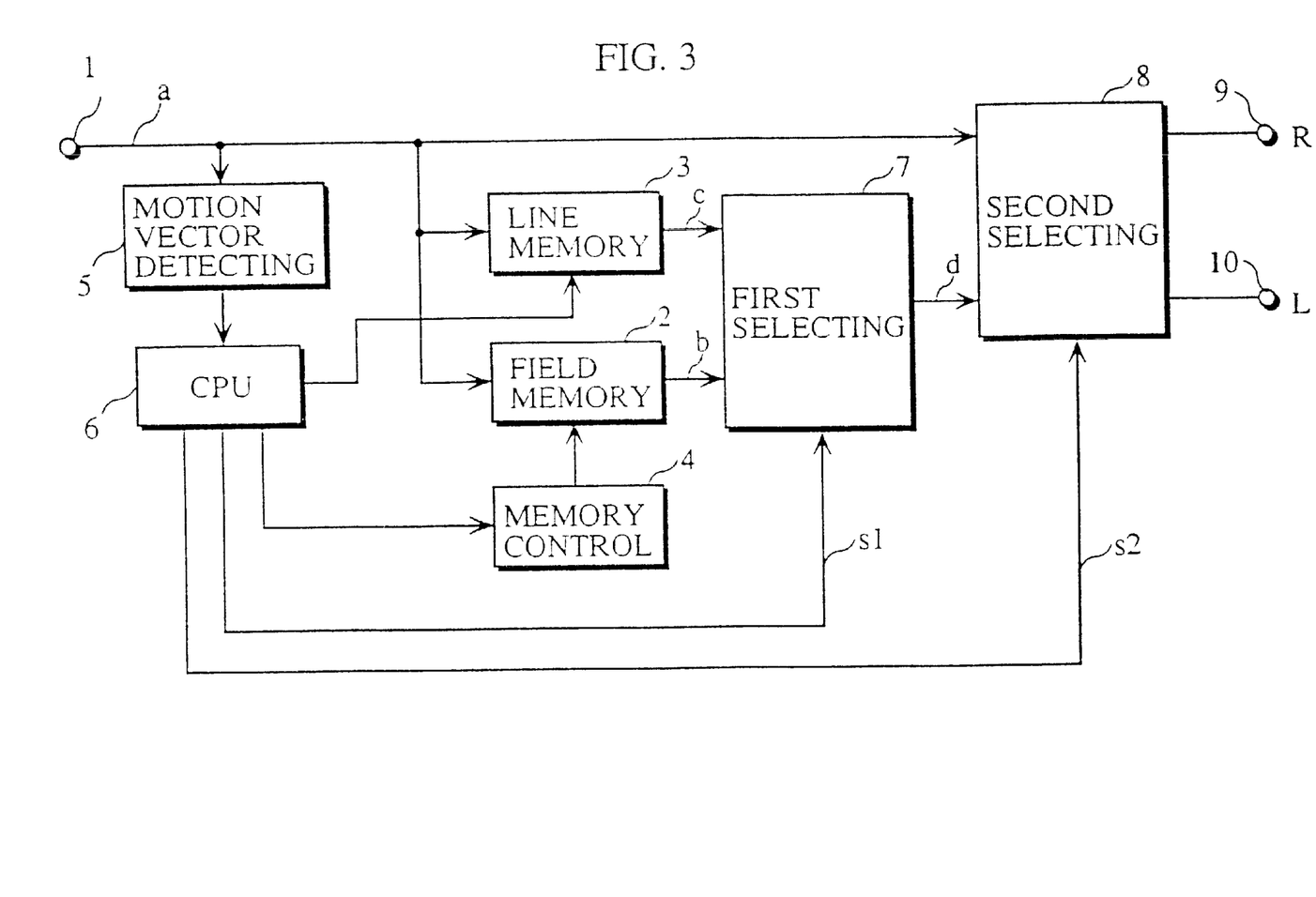
FIG. 3 is a block diagram showing the construction of a 2 D/3 D converter for realizing a method of converting a 2 D image which is a moving image or a still image into a 3 D image.

FIG. 3 illustrates an example of a 2 D/3 D converter capable of obtaining a 3 D image signal having binocular parallax even when a 2 D image is a still image.

A 2 D image signal $\underline{a}$ is inputted to an input terminal 1. The 2 D image signal $\underline{a}$ is sent to a motion vector detecting circuit 5, a line memory 3, a plurality of field memories 2, and a second selecting circuit 8, respectively.

The motion vector detecting circuit 5 detects a motion vector corresponding to the movement between fields of the 2 D image signal $\underline{a}$ on the basis of a representative point matching method, as is well known. Data on the motion vector detected by the motion vector detecting circuit 5 is sent to a CPU 6.

The plurality of field memories 2 are provided so as to delay the 2 D image signal $\underline{a}$ for each field and output the delayed image signal. The 2 D image signal $\underline{a}$ inputted to the input terminal 1 is successively written into the field memories 2 determined in a predetermined order for each field.

The writing and the reading of the signal to and from each of the field memories 2 are controlled by a memory control circuit 4. The memory control circuit 4 reads out an image signal which is delayed from the 2 D image signal a by the number of fields corresponding to delay which is sent from the CPU 6 out of 2 D image signals stored in the respective field memories 2. The delay is variably controlled in the range of zero to a maximum of 60 fields (corresponding to approximately one second in the NTSC (National Television System Committee) system). An image signal $\underline{b}$ read out of the field memory 2 is sent to a first selecting circuit 7.

The 2 D image signal $\underline{a}$ is successively stored for each horizontal scanning period in the line memory 3. The 2 D image signal $\underline{a}$ corresponding to one horizontal scanning period which is stored in the line memory 3 is read out by adjusting the position where the readout of the 2 D image signal is started within a predetermined range (for example, within a range of ±48 pixels) by the CPU 6. Consequently, the position where the 2 D image signal is displayed is horizontally shifted. An image signal $\underline{c}$ read out of the line memory 3 is sent to the first selecting circuit 7.

Consequently, the image signal $\underline{c}$ read out of the line memory 3 and the image signal $\underline{b}$ read out of the field memory 2 are inputted to the first selecting circuit 7. The first selecting circuit 7 selects either one of the image signal $\underline{c}$ and the image signal $\underline{b}$ and outputs the selected image signal by a judging signal s1 outputted from the CPU 6. An image signal $\underline{d}$ ($\underline{b}$ or $\underline{c}$) outputted from the first selecting circuit 7 is sent to the second selecting circuit 8.

The image signal $\underline{a}$ inputted to the input terminal 1 and the image signal $\underline{d}$ ($\underline{b}$ or $\underline{c}$) outputted from the first selecting circuit 7 are inputted to the second selecting circuit 8. The second selecting circuit 8 switches the input signals $\underline{a}$ and $\underline{d}$ ($\underline{b}$ or $\underline{c}$) depending on a control signal s2 sent from the CPU 6 and outputs the signals to a right eye image output terminal 9 and a left eye image output terminal 10.

The CPU 6 calculates the delay for determining an image signal to be read out of the field memory 2 on the basis of a horizontal component of the motion vector. Specifically, if the horizontal movement of an object is large, that is, the horizontal component of the motion vector is large, the delay is so determined as to be decreased. On the contrary, if the horizontal component of the motion vector is small as at the time of reproduction of a still image or at the time of slow-motion reproduction, the delay is so determined as to be increased.

In this example, the maximum value of the delay is 60 fields, which correspond to one second in the NTSC system, and one second can almost correspond to a normal image scene. In the case of lower-speed slow-motion reproduction, however, the maximum value of the delay may be not less than 60 fields.

Furthermore, the CPU 6 judges on the basis of the horizontal component of the motion vector whether the image currently inputted is a sill image or a moving image. Specifically, it is judged that the image currently inputted is a still image when the horizontal component of the motion vector is not more than a predetermined value, while it is judged that the image currently inputted is a moving image when the horizontal component of the motion vector exceeds a predetermined value. The judging signal s1 of "1" is produce when it is judged that the image currently inputted is the still image, while the judging signal s1 of "0" is produced when it is judged that the image currently inputted is the moving image, to supply the judging signal s1 to the first selecting circuit 7.

The first selecting circuit 7 selects the output of the line memory 3 (the signal $\underline{c}$) when the judging signal s1 is "1", that is, it is judged that the image currently inputted is a still image. On the other hand, the first selecting circuit 7 selects the output of the field memory 2 (the signal $\underline{b}$) when the judging signal s1 is "0", that is, it is judged that the image currently inputted is a moving image.

Furthermore, the CPU 6 controls the second selecting circuit 8 on the basis of the direction of the horizontal component of the motion vector. Specifically, if the horizontal component of the motion vector is directed from the left to the right, the second selecting circuit 8 outputs the 2 D image signal $\underline{a}$ as a left eye image signal L to the left eye image output terminal 10 and outputs the output $\underline{d}$ of the first selecting circuit 7 as a right eye image signal R to the right eye image output terminal 9. On the contrary, if the horizontal component of the motion vector is directed from the right to the left, the second selecting circuit 8 outputs the output d of the first selecting circuit 7 as a left eye image signal L to the left eye image output terminal 10 and outputs the 2 D image signal a as a right eye image signal R to the right eye image output terminal 9.

Furthermore, the CPU 6 adjusts the shift amount in a case where the image signal a is horizontally shifted using the line memory 3.

Operations performed by the 2 D/3 D converter shown in FIG. 3 will be described.

Description is now made of operations performed when it is judged that the image currently inputted is a moving image.

The delay is so determined that the larger the horizontal component of the motion vector is, the smaller the delay is, while the smaller the horizontal component of the motion vector is, the larger the delay is.

When the horizontal component of the motion vector is not less than a predetermined value, it is judged that the image currently inputted is a moving image, whereby the judging signal s1 of "0" is supplied to the first selecting circuit 7. Consequently, the image signal b read out of the field memory 2 is outputted from the first selecting circuit 7, and is supplied to the second selecting circuit 8.

If the horizontal component of the motion vector is directed from the left to the right, the 2 D image signal a supplied from the input terminal 1 is sent to the left eye image output terminal 10 through the second selecting circuit 8, and the image signal b supplied from the first selecting circuit 7 is sent to the right eye image output terminal 9 through the second selecting circuit 8.

If the horizontal component of the motion vector is directed from the right to the left, the 2 D image signal a supplied from the input terminal 1 is sent to the right eye image output terminal 9, and the image signal b supplied from the first selecting circuit 7 is sent to the left eye image output terminal 10.

As a result, if it is judged that the image currently inputted is a moving image, a 3 D image signal (a left eye image signal L and a right eye image signal R) having binocular parallax corresponding to the speed of the movement of the object and the delay is obtained on the principle described using FIGS. 1a, 1b and 1c.

The left eye image signal L and the right eye image signal R obtained are supplied to a 3 D display by a lenticular method, for example, thereby to obtain a 3 D image having a 3 D effect.

Description is now made of the operations in a case where it is judged that the image currently inputted is a still image.

When the horizontal component of the motion vector is zero or not more than a predetermined value, it is judged that the image currently inputted is a still image, whereby the judging signal s1 of "1" is supplied to the first selecting circuit 7. Consequently, the image signal c read out of the line memory 3 is outputted from the first selecting circuit 7, and is supplied to the second selecting circuit 8. The previous level of the control signal S2 to the second selecting circuit 8 is held when the horizontal component of the motion vector is zero.

One of the image signal a supplied to the second selecting circuit 8 from the input terminal 1 and the image signal c obtained by horizontally shifting the image signal a is outputted as a left eye image signal L, and the other image signal is outputted as a right eye image signal R.

As a result, if it is judged that the image currently inputted is a still image, a 3 D image signal (a left eye image signal L and a right eye image signal R) having binocular parallax corresponding to the shift amount is obtained on the principle described using FIGS. 2a, 2b and 2c. If the left eye image signal L and the right eye image signal R obtained are supplied to a 3 D display by a lenticular method, for example, a 3 D image having a 3 D effect is obtained.

A line memory may be also provided in the succeeding stage of the field memory 2, to horizontally shift the image (the image signal b) read out of the field memory 2, and then send the image to the first selecting circuit 7. This makes it possible to adjust a 3 D effect if the image currently inputted is a moving stage.

(2) Description of a second embodiment of the present invention

Referring to FIGS. 4 to 8, a second embodiment of the present invention will be described.

Figure 4:
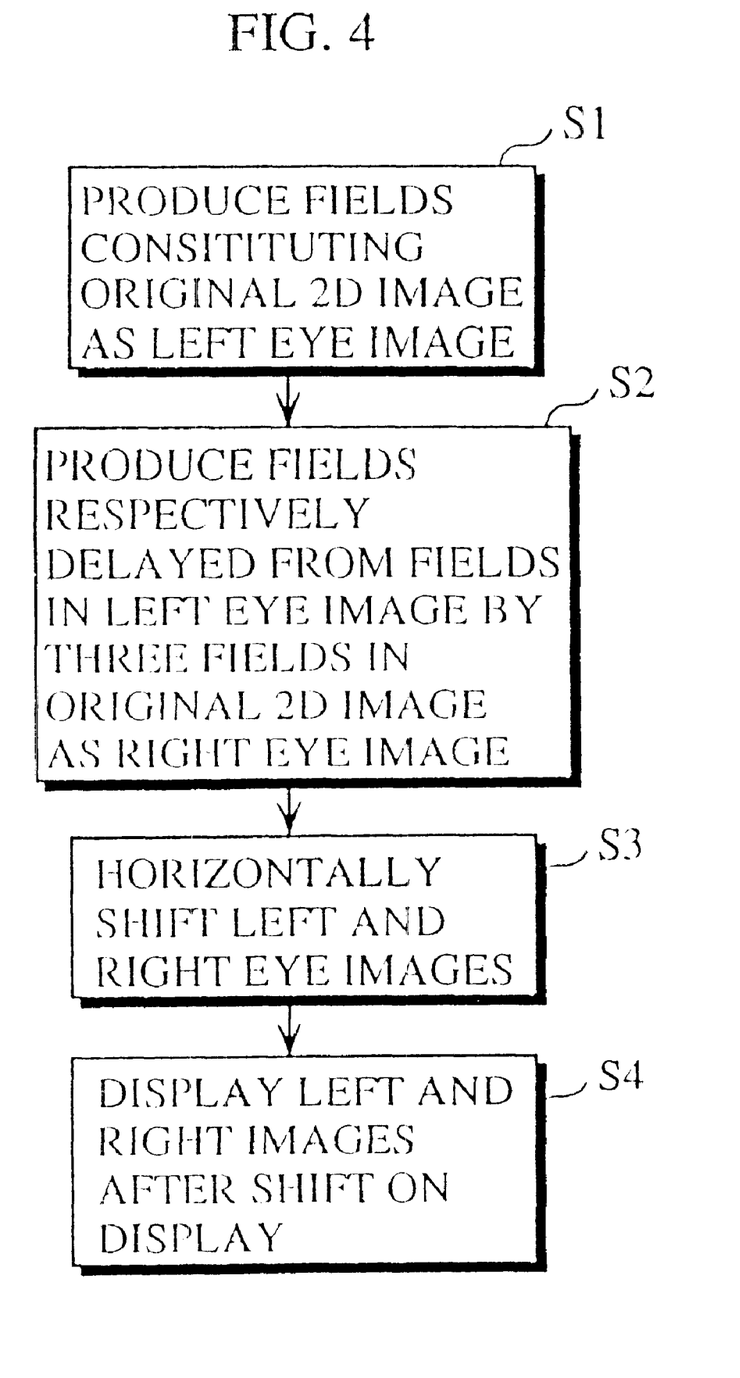
FIG. 4 is a flow chart showing the procedure for a method of converting a 2 D image in which an object does not move and a background moves into a 3 D image.

FIGS. 4 shows the procedure for a method of converting 2 D images into 3 D images.

Figure 6:
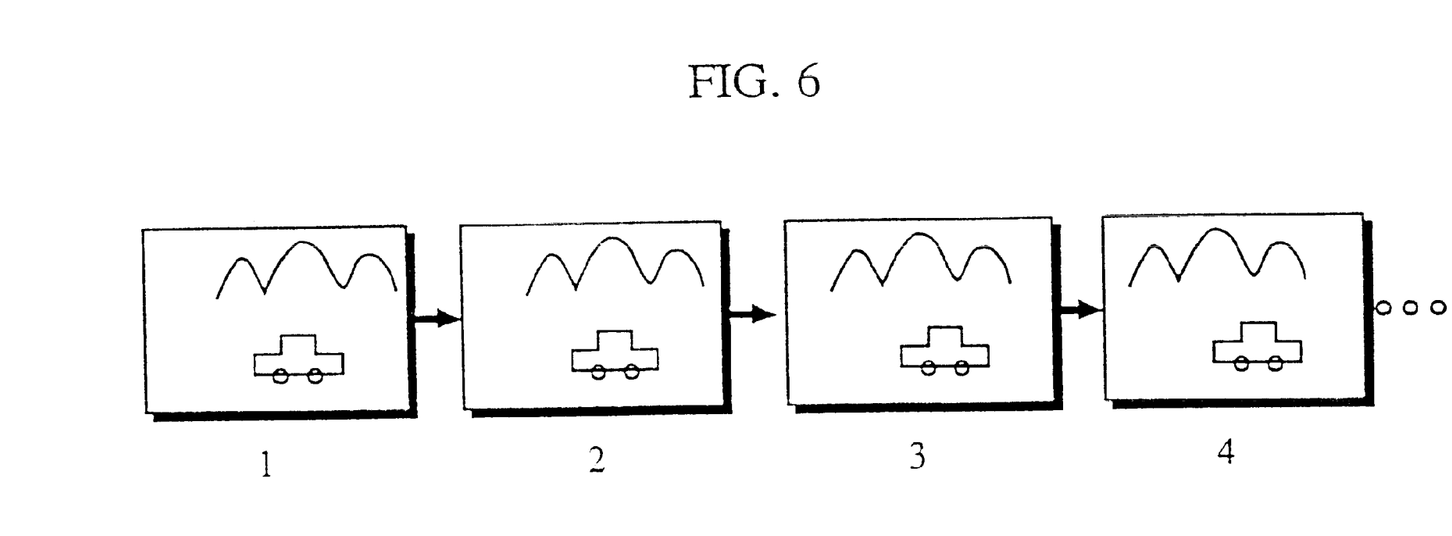
FIG. 6 is a schematic view showing the contents of the original image signal.

It is assumed that the original 2D image is an image in which an object (an automobile in this example) does not move and a background (a mountain in this example) moves from the right to the left, as shown in FIG. 6.

The same fields on the time base as fields constituting the original 2 D image are produced as a left eye image (step S1). Fields which are respectively delayed on the time base from the fields in the left eye image by several fields, for example, three fields in the original 2 D image are produced as a right eye image (step S2).

Figure 5:
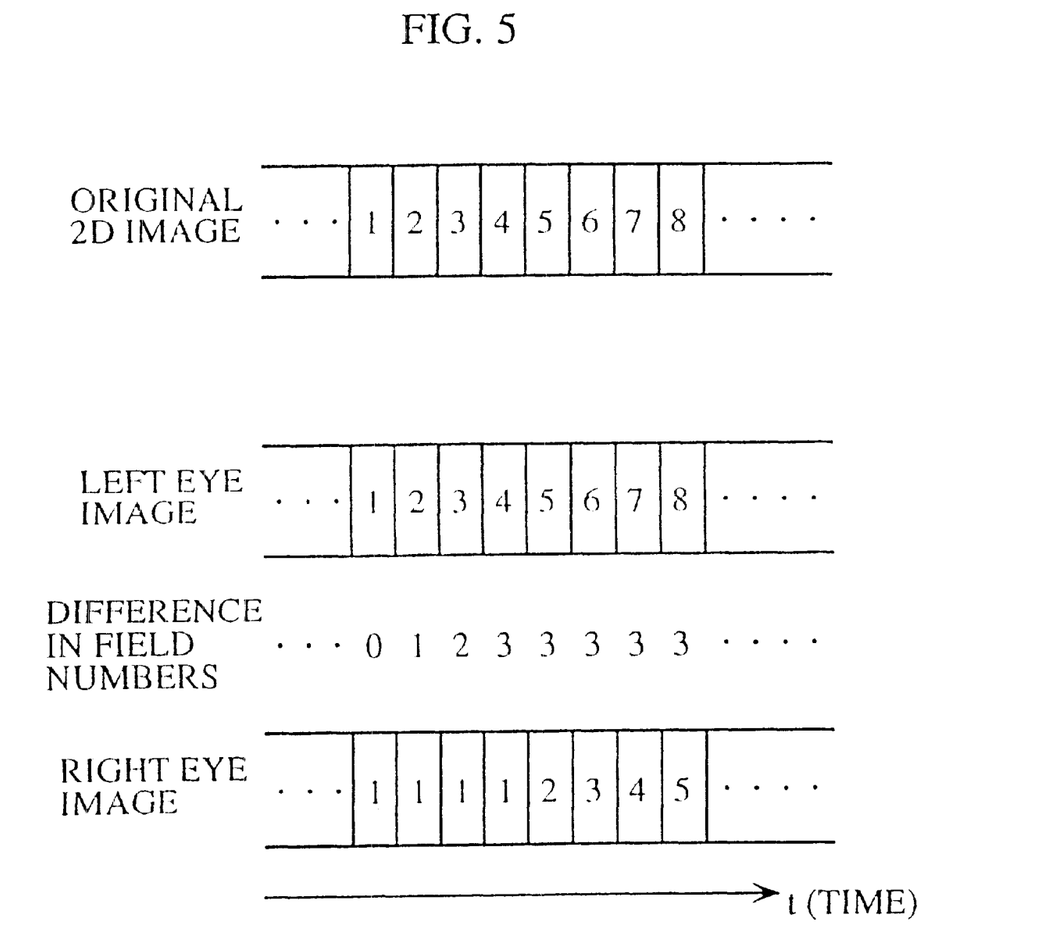
FIG. 5 is a schematic view showing field numbers of the original 2 D image, fields selected as a left eye image from the original 2 D image, fields selected as a right eye image from the original 2 D image, and the difference in field numbers between the left eye image and the right eye image, respectively.

Description is made of the operations in the foregoing steps S1 and S2 using FIG. 5. FIG. 5 shows field numbers of the original 2 D image, fields selected as a left eye image from the original 2 D image, fields selected as a right eye image from the original 2 D image, and the difference in field numbers between the left eye image and the right eye image, respectively.

In the foregoing step S1, the same fields on the time base as fields constituting the original 2 D image are taken as a left eye image. In the foregoing step S2, fields which are respectively delayed on the time base from the fields in the left eye image by several fields (three fields in this example) in the original 2 D image are taken as a right eye image. In this example, in the fourth field and the subsequent fields in the original 2 D image, the right eye image is so produced that the difference between the number of the field in the left eye image and the number of the field in the right eye image at the same time is always three.

Figure 7:
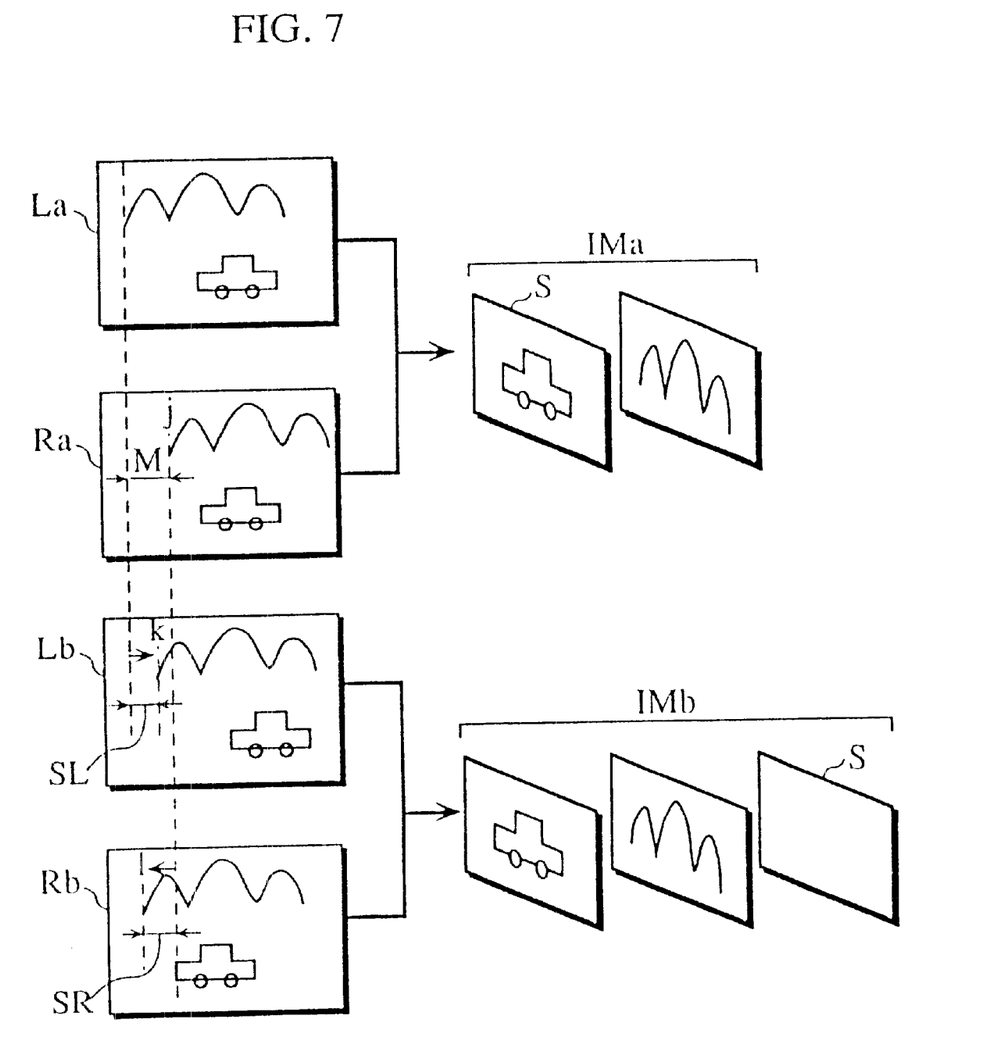
FIG. 7 is a schematic view for specifically explaining a method of converting a 2 D image in which an object does not move and a background moves into a 3 D image.

A left eye image La and a right eye image Ra shown in FIG. 7 illustrate examples of a left eye image and a right eye image at the same time which are obtained in the foregoing steps S1 and S2. In FIG. 7, the fourth field in the original 2 D image is shown as a left eye image La, and the first field in the original 2 D image which is delayed from the left eye image La by three fields is shown as a right eye image Ra.

Since the right eye image Ra is an image which is delayed from the left eye image La by three fields, a position i of a background (a mountain) in the left eye image La and a position j of a background (a mountain) in the right eye image Ra are shifted by the amount of movement M corresponding to three fields of the background. Since an object does not move, the object is in the same position between both the images La and Ra.

If the left eye image La and the right eye image Ra which are obtained in the foregoing steps S1 and S2 are projected on the display almost simultaneously, and both the images projected on the display are separately viewed with the left eye and the right eye of a viewer by glasses for 3 D (for example, liquid crystal shutter glasses or polarization glasses), a lenticular method or the like, a 3 D image as indicated by IMa in FIG. 7 is obtained.

The background in the left eye image La is positioned on the left side of the background in the right eye image Ra. In the obtained 3 D image IMa, therefore, an object and a background are recognized as if the object existed on a screen surface S and the background existed on the innermost side of (behind) the screen surface S. As a result, the object is recognized as if it jumped out forward from the background. Since the distance from the screen surface S to an image of the object (an automobile) recognized by the viewer is zero, however, an impressive 3 D image is not obtained.

The left eye image and the right eye image which are obtained in the foregoing steps S1 and S2 are further subjected to the following processing. Specifically, both the left eye image and the right eye image which are obtained in the foregoing steps S1 and S2 are horizontally shifted, respectively (step S3).

In this case, the shift amount and the shift direction will be described by taking as an example the left eye image La and the right eye image Ra shown in FIG. 7. As indicated by Lb in FIG. 7, the left eye image La is shifted to the right by a shift amount SL. That is, the position i in the left eye image La leads to a position k in the left eye image Lb after the shift.

As indicated by Rb in FIG. 7, the right eye image Ra is shifted to the left by a shift amount SR. That is, the position j in the right eye image Ra leads to a position 1 in the right eye image Rb after the shift.

The respective shift amounts SL and SR from both the images La and Ra are so set that the amounts are equal to each other and the sum of the amounts (SL+SR) is larger than the amount of movement M corresponding to three fields of the background. In addition, the shift from both the left and right eye images La and Ra are so set as to be rightward from the left eye image and be leftward from the right eye image.

The above described shifting operation is an operation of simply horizontally shifting the whole of an image within a display frame with the display frame fixed. Therefore, there occurs a area where there is no pixel information in either one of right and left ends within the display frame by the shifting operation. In the area where there is no pixel information, the area may be filled with data on the basis of pixel data in the vicinity of the area.

If the original 2 D image is produced in accordance with the standard of a 16:9 wide-screen television, and the produced original 2 D image is projected on a normal 4:3 television, it is possible to prevent a area where there are no pixels from occurring within a display frame of the 4:3 television by the shifting operation.

The left eye image and the right eye image which are obtained in the foregoing step S3 are displayed on the display (step S4). If the left eye image and the right eye image which are obtained in the foregoing step S3 are projected on the display, and both the images projected on the display are separately viewed with the left eye and the right eye of the viewer by glasses for 3 D, a lenticular method or the like, a 3 D image as indicated by IMb in FIG. 7 is obtained.

A background in the left eye image Lb is positioned on the right side of a background in the right eye image Rb, and an object in the left eye image Lb is positioned on the right side of an object in the right eye image Rb. Moreover, the distance between the objects in both the images Lb and Rb (corresponding to binocular parallax) is larger than the distance between the backgrounds in both the images Lb and Rb (corresponding to binocular parallax). In a 3 D image IMb obtained, therefore, a background and an object are recognized as if the background existed ahead of a screen surface S and the object existed ahead of the background. Since the distance from the screen surface S to an image of the object recognized by the viewer is thus increased, an impressive 3 D effect is obtained.

If the background (the mountain) moves from the left to the right, the same fields on the time base as fields constituting the original 2 D image are produced as a right eye image, and fields which are respectively delayed from the fields in the right eye image by several fields, for example, three fields in the original 2 D image are produced as a left eye image.

Although in the foregoing step S3, both the left eye image and the right eye image which are obtained in the foregoing steps S1 and S2 are horizontally shifted, only one of the left eye image and the right eye image which are obtained in the foregoing steps S1 and S2 may be horizontally shifted.

Figure 8:
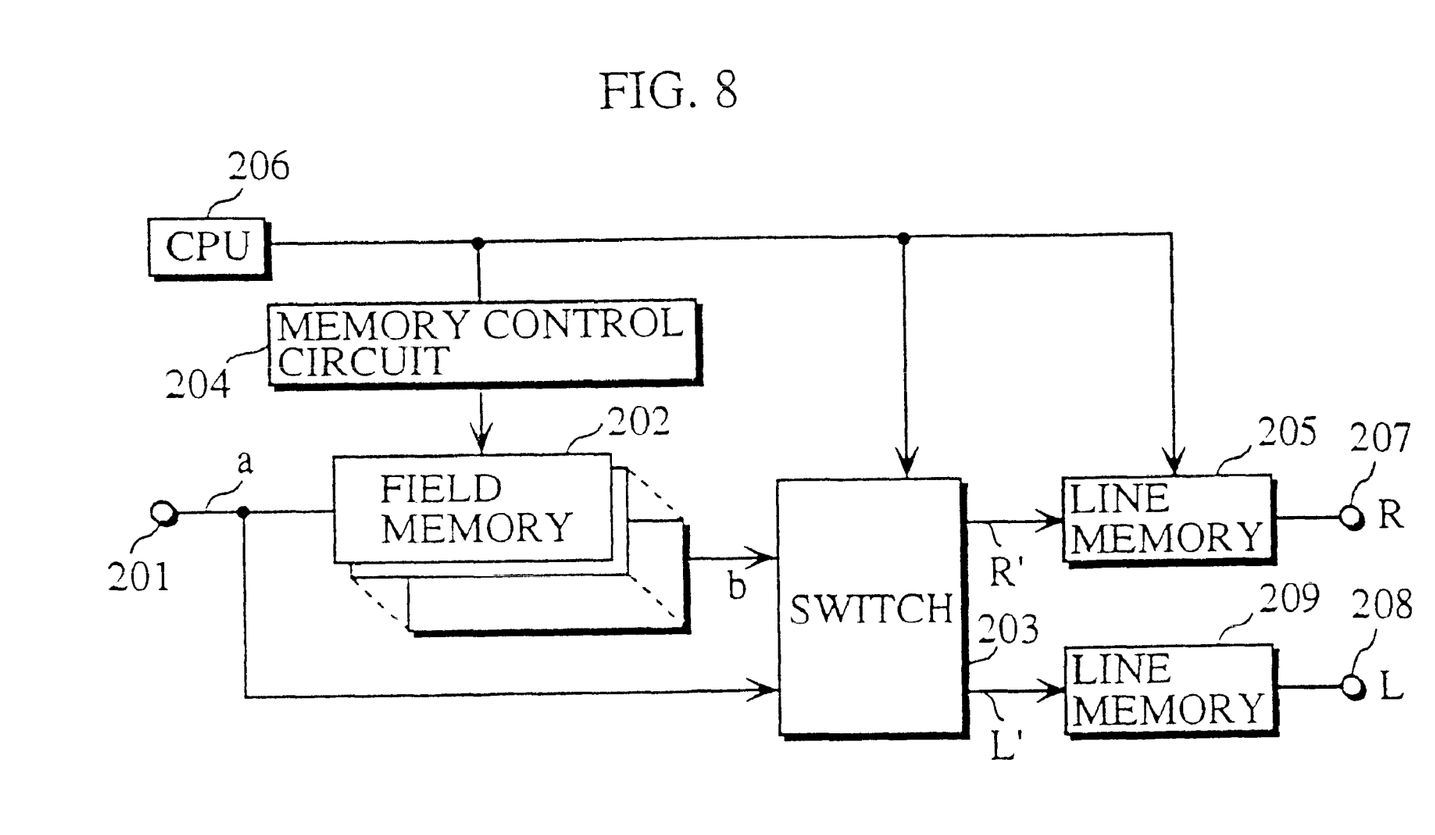
FIG. 8 is a block diagram showing the construction of a 2 D/3 D converter for realizing a method of converting a 2 D image in which an object does not move and a background moves into a 3 D image.

FIG. 8 illustrated a 2 D/3 D converter for realizing the above described method of converting 2 D images into 3 D images.

An original 2 D image signal $a$ is inputted to an input terminal 201. The 2 D image signal $a$ inputted to the input terminal 201 is sent to a plurality of field memories 202 and a switch 203, respectively.

Each of the field memories 202 is provided so as to delay the 2 D image signal $a$ for each field and output the delayed image signal. The 2 D image signal $a$ inputted to the input terminal 201 is successively written into the field memories 202 determined in a predetermined order for each field. The writing and the reading of the signal to and from each of the field memories 202 are controlled by a memory control circuit 204. The memory control circuit 204 reads out an image signal which is delayed from the 2 D image signal $a$ by the number of fields corresponding to delay which is sent from a CPU 206 out of 2 D image signals stored in the respective field memories 202.

An image signal $b$ read out of the field memory 202 is sent to the switch 203. Consequently, the 2 D image signal a inputted to the input terminal 201 and the signal $b$ which is delayed by a predetermined number of fields from the 2 D image signal $a$ are inputted to the switch 203. The switch 203 switches the input signals $a$ and $b$ depending on the direction of the movement of the background which is sent from the CPU 206 and outputs the signals to a right eye line memory 205 and a left eye line memory 209.

For example, it is assumed that the original 2 D image is an image in which a background (a mountain) moves from the right to the left, as shown in FIG. 3. In this case, the 2 D image signal $a$ is sent to the left eye line memory 209 as a left eye image signal L', and the delayed image signal $b$ is sent to the right eye line memory 205 as a right eye image signal R'.

Each of the line memories 205 and 209 is provided so as to shift the image signal inputted thereto in a predetermined direction on the basis of information on the shift amount and the shift direction which are sent from the CPU 206, similarly to the line memory 3 shown in FIG. 3 in the first embodiment. An output of the line memory 205 is sent to the right eye image output terminal 207 as a right eye image signal R. An output of the line memory 209 is sent to the left eye image output terminal 208 as a left eye image signal L.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of converting two-dimensional images into three-dimensional images, comprising the steps of:

determining whether a two-dimensional image is a moving image or a still image;

obtaining from said two-dimensional image, a first image which forms an original image at a time base and a second image which is delayed along the time base from said first image and outputting one of said first image and said second image as a left eye image and outputting the other image as a right eye image when the two-dimensional image is determined to be a moving image; and obtaining from said two-dimensional image, a third image which forms an original image at a base image and a fourth image obtained by horizontally shifting said third image and outputting one of said third image and said fourth image as a left eye image and outputting the other image as a right eye image when the two dimensional image is determined to be a still image.

2. The method according to claim 1, further comprising the step of detecting a vector on the movement of said two-dimensional image, to determine that the two-dimensional image is a still image when a horizontal component of said vector is not more than a predetermined value, and determine that the two-dimensional image is a moving image when the horizontal component of said vector is more than said predetermined value.

3. The method according to claim 1, wherein said second image is obtained by storing said first image in a memory and reading out from the memory an image which is delayed by a predetermined number of fields from the first image.

4. The method according to claim 1, wherein said fourth image is obtained by storing said third image in a memory for each horizontal scanning period and adjusting the position where the readout of the image stored in the memory is started to read out the image stored in the memory.

5. The method according to claim 3, wherein said fourth image is obtained by storing said third image in a memory for each horizontal scanning period and adjusting the position where the readout of the image stored in the memory is started to read out the image stored in the memory.

6. A method of converting two-dimensional images into three-dimensional images, comprising the steps of:

obtaining, from a two-dimensional image, a first image which forms an original image at a time base and a second image which is delayed along the time base said first image;

selecting based upon a direction of motion of the two dimensional image, a) one of said first image and said second image as a first left eye image, and b) the other of said first image and said second image as a first right eye image; and obtaining a second left eye image by horizontally shifting the first left eye image, and outputting said second left eye image and said first right eye image as a three-dimensional image.

7. The method according to claim 6, wherein said second image is obtained by storing said first image in a memory and reading out from the memory an image which is delayed by a predetermined number of fields from the first image.

8. The method according to claim 6, wherein said second left eye image is obtained by storing said first left eye image in a memory for each horizontal scanning period and adjusting the position where the readout of the image stored in the memory is started to read out the image stored in the memory.

9. The method according to claim 7, wherein said second left eye image is obtained by storing said first left eye image in said memory for each horizontal scanning period and adjusting the position where the readout of the image stored in the memory is started to read out the image stored in the memory.

10. A method of converting two-dimensional images into three-dimensional images, comprising the steps of:

obtaining, from a two-dimensional image, a first image which forms an original image at a time base and a second image which is delayed along the time base from said first image;

selecting based upon a direction of motion of the two dimensional image, a) one of said first image and said second image as a first left eye image, and b) the other of said first image and said second image as a first right eye image; and obtaining a second right eye image by horizontally shifting the first right eye image, and outputting said second right eye image and said first left eye image as a three-dimensional image.

11. The method according to claim 10, wherein said second image is obtained by storing said first image in a memory and reading out from the memory an image which is delayed by a predetermined number of fields from the first image.

12. The method according to claim 10, wherein said second right eye image is obtained by storing said first right eye image in a memory for each horizontal scanning period and adjusting the position where the readout of the image stored in the memory is started to read out the image stored in the memory.

13. The method according to claim 11, wherein said second right eye image is obtained by storing said first right eye image in said memory for each horizontal scanning period and adjusting the position where the readout of the image stored in the memory is started to read out the image stored in the memory.

* * * * *